United States Patent [19]

Resing et al.

[11] Patent Number: 4,622,152

[45] Date of Patent: Nov. 11, 1986

[54] COMBINED MIXING, REACTING, DRYING AND FILTERING DEVICE

[75] Inventors: Thomas A. Resing, Fort Wright, Ky.; George L. Ely, Cincinnati, Ohio

[73] Assignee: Littleford Bros., Inc., Florence, Ky.

[21] Appl. No.: 732,261

[22] Filed: May 9, 1985

Related U.S. Application Data

[63] Continuation-in-part of Ser. No. 559,629, Dec. 8, 1983, abandoned.

[51] Int. Cl.[4] .............. B01D 35/00

[52] U.S. Cl. .............. 210/769; 210/413; 210/414

[58] Field of Search .............. 210/767, 768, 769, 407, 210/408, 413, 414, 415; 366/241, 279, 292, 302, 303, 309, 310, 312, 313; 422/187, 224, 225, 226, 229

[56] References Cited

U.S. PATENT DOCUMENTS

| | | | |
|---|---|---|---|
| 1,382,056 | 6/1921 | Bontemps et al. | 210/408 |
| 1,734,999 | 11/1929 | Cruickshank | 210/408 |
| 2,521,121 | 9/1950 | Kilpatrick | 210/8.5 |
| 3,027,102 | 3/1962 | Lodige et al. | 241/98 |
| 3,161,591 | 12/1964 | Petter et al. | 210/251 |
| 3,460,681 | 8/1969 | List et al. | 210/415 |
| 3,902,962 | 9/1975 | Reinhall | 162/246 |
| 4,032,442 | 6/1977 | Peterson | 210/82 |

OTHER PUBLICATIONS

Chemical Engineers' Handbook, Perry & Chilton, Fifth Edition, pp. 19-69 to 19-72.

*Primary Examiner*—Frank Sever
*Attorney, Agent, or Firm*—Frost & Jacobs

[57] ABSTRACT

A single apparatus including a mixing vessel and mixing means for achieving a slurry of material introduced within the vessel. A filter is mounted within the vessel in the region of the material being mixed so as to be contacted by the slurry created. The filter is mounted within the vessel in such manner as to efficiently filter, efficiently separate particles from liquid, without interfering or hindering the proper mix action. Mixing, reacting, washing, filtering, vacuum or purge drying, and particle sizing of powdered or granular materials stemming from the slurry, for the process industry, is achieved by reason of the incorporation of the filter within the mixing chamber of a positive-action mixer as described. The successive processing steps of mixing, reacting, washing, filtering, vacuum or purge drying, including the forming of a layer of matter on the filter, coupled with devices by which the layer may be periodically removed and any skin formed thereon also removed, and processing to powdered or granular materials from an initial dry batch or slurry, are accomplished in a single processing vessel without discharging the batch until the entire processing sequence is completed. The mixer, filter arrangement is particularly well suited for use in organic chemical synthesis.

19 Claims, 14 Drawing Figures

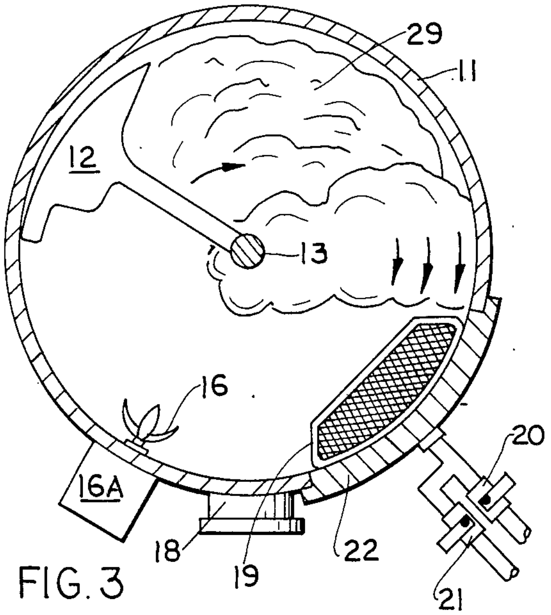
FIG. 3
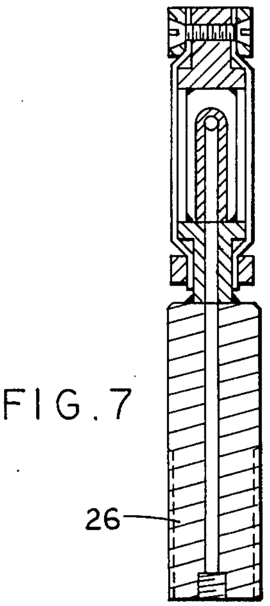
FIG. 7
FIG. 4
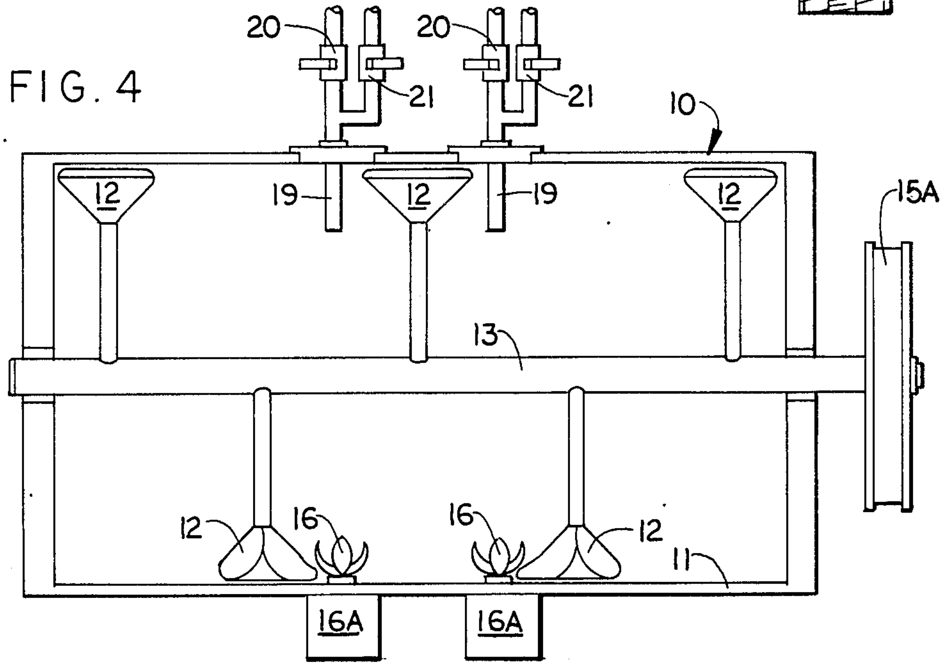

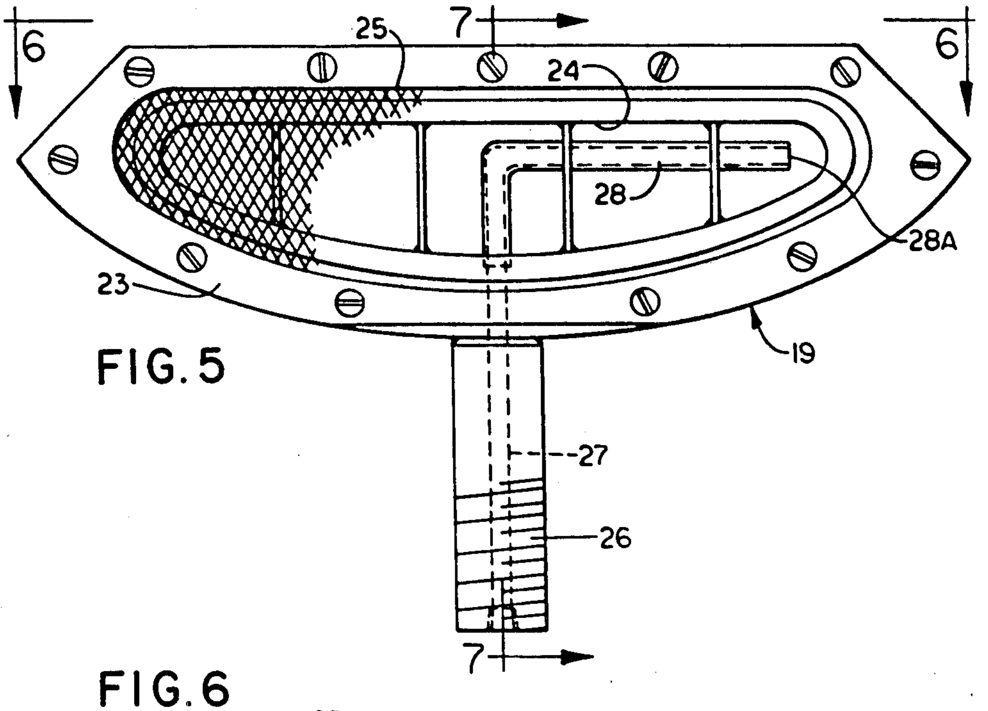
FIG. 5
FIG. 6
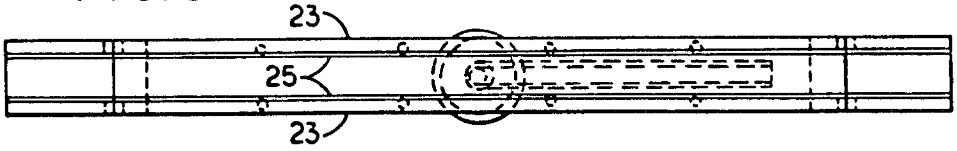

GENERAL TREND FOR DISCRETE PARTICLES, AVG. DIAMETER VS. CAKE RESISTANCE

COMBINED MIXING, REACTING, DRYING AND FILTERING DEVICE

PRIOR APPLICATION

The instant application is a continuation-in-part application of prior application Ser. No. 559,629 filed Dec. 8, 1983, now abandoned, and entitled Combined Mixing, Reacting, Drying and Filtering Device; such prior application was in the names of the same inventors listed herein.

TECHNICAL FIELD

It is contemplated that this invention will find good use in high speed, intensive mixing operations such as in organic chemical synthesis involving a slurry operation wherein liquids and/or gases are removed from a solid/liquid/gas mixture. The invention enables the complete process to be achieved in a single machine, preferably a positive-action mixer, wherein a slurry is relatively quickly brought to a friable condition. The initial mix may be comprised of dry powders or other particulates to which liquid is later added to form the slurry.

The invention is particularly well suited for use with mixing apparatus and vessels such as are shown in, for example, U.S. Pat. Nos. 3,027,102; 2,750,163; and 2,679,385 to Lodige et al. It will be readily apparent to those skilled in the art, however, and as will be amplified herein, that the invention may readily be used with other mixing devices and vessels. The invention incorporates a filter within the mixing vessel so as to provide the ability to mix, react, filter wash and dry in one vessel in a continuous operation. Various combinations of mixing, reacting, washing and/or drying with the filtering operation may also be effected. Filtration may occur under conditions of internal vessel pressure or vacuum conditions at the filter. The mixing and reacting action constantly presents new material to the filter element for exchange with previously presented materials.

BACKGROUND ART

In many previous operations it has been the practice to mix and react a slurry of materials in a first vessel and then transfer the slurry mixture to a separate apparatus for drying and processing. This, of course, results in a duplication of equipment and time. The present invention incorporates a filter element in the mixing, reacting unit in such a manner as to markedly speed up the time it takes to go from the slurry stage to the friable condition and thus makes it possible to carry out mixing, reacting, washing and drying in a single vessel or chamber.

A search was conducted in the United States Patent Office in an effort to develop references which might show or suggest the invention. That search developed the patents listed below but no assertion is made that such references are indeed the closest prior art, although that was the intent of the search. These references disclose various filtering machines which appear to be separate from the mixing, reacting devices.

U.S. Pat. No. 3,365,065; Varjabedian
U.S. Pat. No. 3,902,858; Chernykh
U.S. Pat. No. 3,902,962; Reinhall
U.S. Pat. No. 3,966,607; Gaynor et al.
U.S. Pat. No. 4,003,837; Osborne
U.S. Pat. No. 4,017,399; Lopker U.S. Pat. No. 4,081,381; Rosenmund et al.
U.S. Pat. No. 4,159,953; Paquette
U.S. Pat. No. 4,174,198; Kinoshita
U.S. Pat. No. 4,178,246; Klein
U.S. Pat. No. 4,217,220; Egli et al.
U.S. Pat. No. 4,226,716; White
U.S. Pat. No. 4,234,417; Gauld et al.
U.S. Pat. No. 4,289,616; Hallack
U.S. Pat. No. 4,315,820; Mann
U.S. Pat. No. 4,347,134; Svehaug Prior art mixing vessel design includes such apparatus and arrangements as a horizontal drum having a mixing element rotating about a horizontal axis, a vertical drum having mixing element rotation about a vertical axis, a vertical cone shaped vessel having vertical mixing elements rotating both about their own axes and about the inside circumference of the vessel, horizontal open trough type vessels having mixing element rotation about a horizontal axis, rotating vessels having fixed or rotating mixing elements with rotation being about a horizontal or vertical axis, and other devices as well. None of these, however, has incorporated a filter within the mixing vessel in the manner of the present invention so as to achieve mixing, reacting, washing and/or drying, or any combination of these, along with filtering, within that vessel in a continuous manner so as to bring the mixed materials from a slurry condition to a friable state.

Other prior art of interest, however, has also come to light. In addition to the earlier mentioned U.S. Pat. No. 3,027,102 Lodige et al, there are the U.S. Pat. Nos. 3,460,681 List et al, 2,521,121 Kilpatrick, 3,902,962 Reinhall, 1,382,056 Bontemps et al, 4,032,442 Peterson, 3,161,591 Petter et al, and 1,734,999 Cruickshank; in addition the disclosure in Chemical Engineers' Handbook, Perry & Chillon, Fifth Edition, Pages 19-69 to 19-72 is of interest. The more important of these references appear to be the patents to List et al and Kilpatrick in that they disclose some sort of filter in conjunction with some sort of mixing device, along with the Chemical Engineers' Handbook which discloses a filter of the general type which may be employed with this invention.

DISCLOSURE OF THE INVENTION

A filter element is incorporated within a mixing, reacting vessel. In general this element may be located anywhere around the internal circumference of, or in a location central to, the vessel volume. Specifically this may be accomplished by extending the filter element through the wall of the vessel into the mixing area, or the filter element may be structurally supported in a central portion of the vessel, or the filter element may be mounted so as to form a part of the end or side wall of the vessel, or the filter element may be permanently affixed in position, or temporarily mounted, so as to be insertable and/or removable during processing. Preferably the filter element is such that it may be cleaned by flexing thereof either pneumatically or mechanically, or by reversing flow (using gas or liquid) through the element, or even by a combination of these methods. This backwashing ability is also used in carrying out the invention wherein it is also desirable to first build up a layer of matter on the filter to help trap small particles and then to pop off such layer thereby removing the skin of aggregated particles which often forms thereon.

It is important to the apparatus and process of this invention that intensive mixing be achieved. This helps to keep too thick a layer of matter from building up on the filter. This can be accomplished by the positive action mixer herein disclosed. Any excess matter which does begin to build up on the filter is quite quickly removed so that the aforementioned skin is also removed and broken up. This may be aided by arranging certain of the mixing elements so that they pass relatively close to the faces of the filter at high speed.

The filter does not have to be stationary. It could, for example, rotate. This could be achieved by attaching it to the mixing shaft or by securing it to a rotating drum. It must be so mounted, however, fixed or rotatable, or otherwise movable within the mixing, reacting chamber, as to come into contact with the slurry.

The filter element may be mounted on a frame providing structural support for the element. The actual filter media may be made of a metallic material or of synthetic or natural fabrics. In one form of the invention the filter element comprises a wire cage supporting a Teflon cloth.

In the preferred form of the invention a vacuum is drawn on the filter device to provide positive filtering. This, however, is not always necessary and filtering may be accomplished by the production or introduction of pressure within the mixing chamber by means of a gas or vapor. A number of filter units may be incorporated within the mixing, reacting chamber depending on the size of such chamber and the rate of filtering or dryness to be achieved. The specific configuration of the filtering device may vary. It may also be desirable to arrange such device so that it may be slid into and out of the mixing chamber, suitable seals being provided.

By incorporating a filter device within the mixing, reacting chamber it is possible to speed up the drying action so that the slurry is brought to a friable condition at a rate not heretofore achieved. As indicated, the incorporation of a filter unit in the mixing, reacting unit speed up the time it takes to bring the slurry to a friable condition, thus making mixing, reacting and drying in a single vessel practical. This is particularly important in organic chemical synthesis where, in a single vessel a slurry operation first takes place, closely followed by the filtering or decanting of the liquid portion, washing the insoluble solids to remove soluble substances, and drying of the solids, all in one vessel. Because of the toxic nature of many organic chemicals, performance of all of the aforementioned operations in a single vessel assumes an importance far greater than merely the economics of conducting all the processes in one vessel.

BRIEF DESCRIPTION OF THE DRAWINGS

FIG. 3 is a section through the mixer, partly schematic, showing the relative positions of mixing tool, chopper and filter device.

FIG. 4 is a schematic, rather diagrammatic depiction of a positive-action mixer having a plurality of ploughshare mixing elements, a plurality of rapidly rotating choppers, and a plurality of filter devices arranged within the mixing chamber with a particular relationship among the ploughshares and filters, including also the choppers.

FIG. 5 is an enlarged view of a filter unit, with parts broken away, which may be incorporated in the combined mixing, reacting, drying and filtering device comprising the present invention.

FIG. 6 is a view taken from above FIG. 5.

FIG. 7 is a section taken on the line 7—7 of FIG. 5.

DETAILED DESCRIPTION OF THE INVENTION

Figure 1:
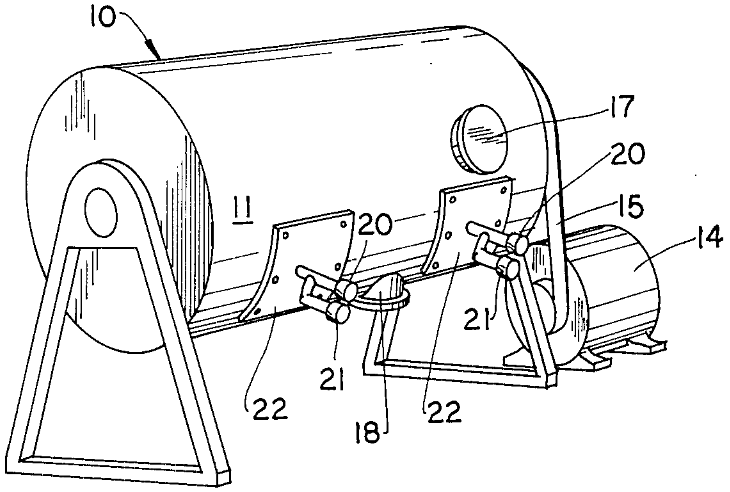
FIG. 1 is a perspective view of a positive-action mixer incorporating at least one filter unit therein in accordance with the teachings of the invention.
Figure 2:
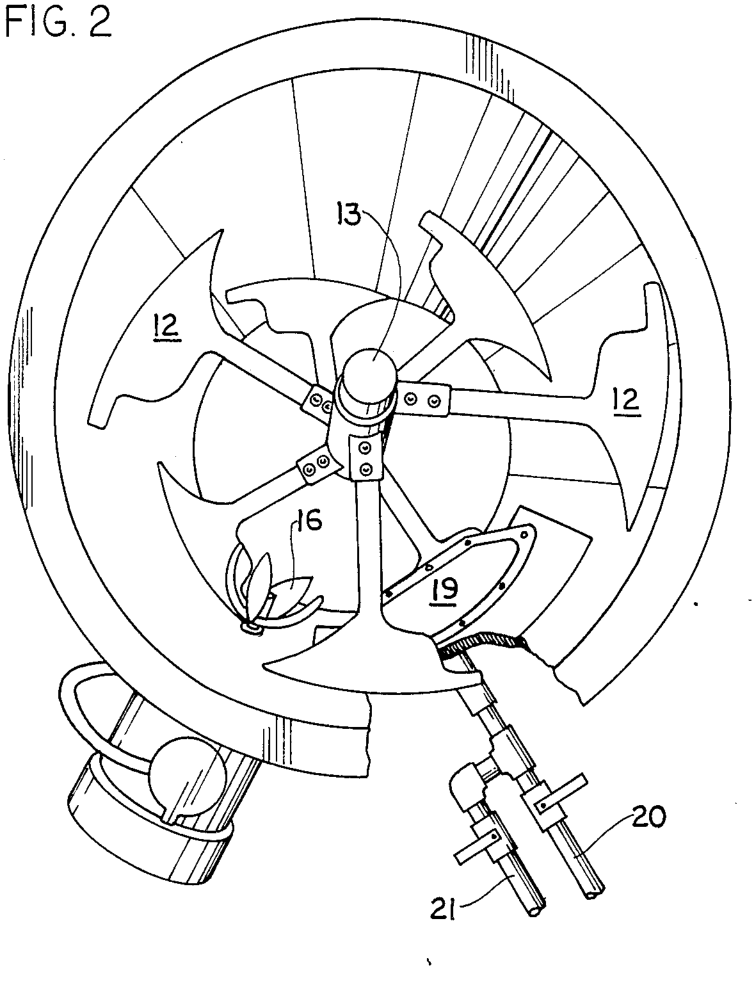
FIG. 2 is a perspective view of the interior of the positive-action mixer showing the preferred relative locations of the primary mixing tools, a rapidly rotating chopper and the filter device.

A mixer, reactor is generally depicted at 10 in FIG. 1. This apparatus is much like that shown in U.S. Pat. No. 3,027,102 to Lodige et al. It includes a mixing drum or container 11 which may or may not be jacketed, for heating or cooling, as desired. Within the drum 11 are a plurality of mixing elements 12 mounted on a horizontal shaft 13 extending centrally through the drum 11. Relative rotational movement is provided between the mixing elements 12 and drum 11. This may be achieved by rotating either the drum, or the shaft 13, or both. Conventional motor and belt transmission means 14 and 15 may be provided for that purpose. The mixing elements 12 may be of the ploughshare type shown and described in considerable detail in the U.S. Pat. Nos. 3,027,102 and 2,679,385 to Lodige et al. The particular mixing elements employed, however, do not constitute a part of this invention except insofar as they are specifically set forth in the claims to follow. Such mixing elements, for example, could be of the paddle type which is also well known in the art. One or more high speed choppers may also be located within the drum 11. These choppers are generally indicated at 16 in the various FIGS. They may or may not be utilized as a part of the invention. When utilized the choppers 16 are disposed in the manner taught in U.S. Pat. No. 3,027,102. The mixing, reacting unit 10 is also provided with conventional filling aperture means 17 and discharge means 18. It is necessary, however, to arrange the various mixing, reacting elements so as to produce positive action, intensive mixing.

In the mixing, reacting unit of this invention a filter device is incorporated within the drum 11. This is generally indicated at 19. The filter device may be connected by piping or the like 20 to a means (not shown) for pulling a vacuum thereon; it may also be connected to piping 21 by which fluid from a source (not shown) may be used to backwash the filter device 19 so as to clean same when needed. Although the piping 20 and 21 are shown as coupled to a common member 26 (see FIG. 5) they could be separately connected to the filter 19. As perhaps best seen in FIG. 4 the filter devices 19 are located within the drum 11 and with respect to the mixing elements 12 in such manner that as the rotating mixing elements 12 pass the filter devices 19 they will aid in preventing undue build up of matter on the surfaces of those filter units. Preferably the filter devices 19 are located in said drum 11 across from the choppers 16 as is also illustrated in FIG. 4. In the embodiment of the invention shown the shaft 13 which carries the mixing elements 12 is rotated via the pulley 15*a* and motor transmission belt means 14, 15. The high speed choppers 16 are individually rotated through now conventional means not shown in detail but generally indicated at 16*a*. The filter arrangement 19, 20 and 21 is illustrated as being attached to an inspection door 22. It will be apparent to those skilled in the art, however, that such arrangement could be mounted elsewhere. As much as the maintenance of a clean, fully operating filter device is crucial in all industrial and municipal operations where liquids are physically removed from solids, the means for removing the filter device is important. Although not shown in detail it would also be possible to provide the drum 11, or the inspection door 22, with a slot and gasket means in order that the filter 19 could be withdrawn from, and inserted into, the mixing chamber as desired.

FIGS. 5, 6 and 7 illustrate a filter device which has been found to work satisfactorily in a mixing vessel such as depicted at 11. Such filter device 19 is comprised of a pair of retainer plates 23 having central openings 24 which are covered with filtering media 25. Such media may be comprised of a Teflon cloth, metal screen or various other materials as will be understood by those skilled in the art. To some extent the nature of the product slurry being mixed and reacted will dictate the type of filtering media to be used. In the preferred arrangement a member 26 will be affixed to the filter device 19 and provided with threaded means by which the vacuum line 20 and back wash line 21 may be affixed thereto. An opening 27 extends through the means 26 and terminates in an L-shaped tube member 28 the free end 28*a* thereof extending to the bottom of the filter device when it is in place within the mixing chamber 11. As fluid matter accumulates within the filter device 19 it may more readily be withdrawn therefrom if the L-shaped tubular member 28 is so positioned.

The foregoing arrangement, as indicated, has been found quite satisfactory. Other arrangements, however, may be utilized. Thus, for example, piping 20 could be arranged so as to communicate directly with the lowermost area of the filter, that area wherein the liquid to be removed accumulates, when the device is in operation. By the same token piping 21 may also be separately attached.

When the mixing, reacting unit generally indicated at 10 is in operation, and there is relative movement between the mixing elements 12 and filter devices 19, the various parts will be in the positions generally indicated in FIGS. 3 and 4. Due to the mixing action of the members 12 the bed of slurry matter within the mixing chamber 11 will take the position generally indicated at 29. Fluid matter which accumulates in the filter device 19 may pass out through the tubular member 28 and opening 27. Preferably a positive withdrawal may be effected by creating a vacuum through the line 20. If the filtering media 25 should become coated it is possible to effect a backwash through the line 21 so as to loosen the matter which caused the coating. Such coating may be kept to a minimum if the filter devices 19 are located very close to the mixing elements 12, i.e., as close as reasonably possible within the mechanical constraints of the unit to account for mechanical deflection under operating conditions. Such backwash and mixing element locations serve to break up the layer and skin as earlier mentioned herein. The preferred location of the choppers 16 is illustrated in FIG. 4. It is to be understood, however, that the use of the choppers 16 is not mandatory. It is the incorporation of the filter device 19 very close to the mixing elements 12 in a mixing vessel 11 which exhibits intensive mixing which constitutes the heart of this invention.

This backwash ability may play a very important part in the practice of this invention under some conditions. In considering this feature, along with filtration in general, two factors of fundamental importance must be taken into account. The first is rate per unit area of filtration and the second is the average percent liquid desired in the final cake. The size of a filter (total area for cake build up) depends directly on the rate per unit area of filtration. Capital costs are related to the filtration area; consequently, it is desirable to maintain as high a rate as possible. The average liquid content of the final cake should be as low as possible in order to minimize costs in subsequent processing, should that be necessary. The energy required to remove liquid by purely thermal methods is about 1,000 times more than that required by mechanical methods involving mixing and squeezing. The present invention greatly reduces such capital costs.

Figure 9:
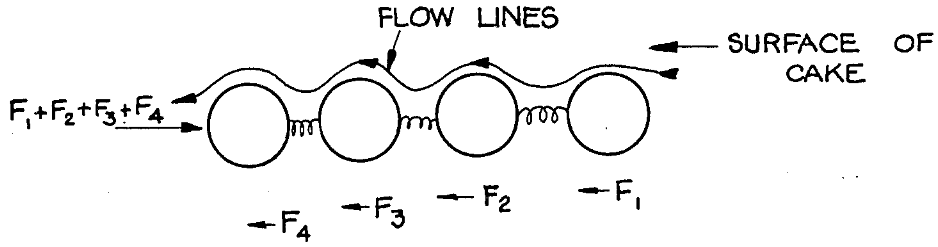
FIG. 9 is a diagrammatic representation of the mechanism of flow of liquid through cakes.

As has been pointed out above, the present invention embraces filtration accompanied by mixing in a closed reactor vessel, namely, a positive-action mixer. This achieves remarkable effects which may be explained by a consideration of the mechanism of flow of liquid through cakes. Thus, as liquid flows past the particles in a cake, a frictional drag is exerted on each particle as shown in FIG. 9.

Figure 10:
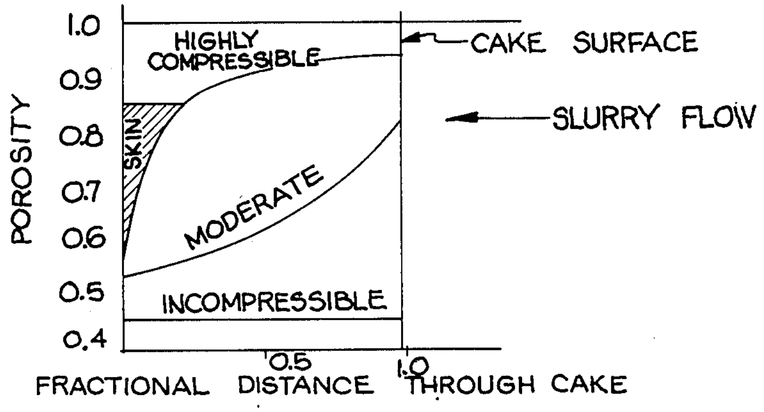
FIGS. 10 through 14 are a plurality of graph-like, diagrammatic-schematic depictions of certain of the phenomena associated with this invention.

The drag accumulates, and the last particle is subject to the sum of the drags on all the other particles. The accumulative drag causes the cake to compress. However, the compression is not generally uniform through the cake and this is depicted in FIG. 10 wherein the porosity (volume fraction of liquid) is plotted against the fractional distance through the cake.

Except for incompressible materials, the porosity decreases as liquid flows through the cake and approaches the medium. It will be observed that the shape of the curves differ greatly for moderately and highly compressible cakes. The highly compressible cakes are the source of many troublesome problems heretofore experienced in practice. As can be seen in FIG. 10, the highly compressible material remains unconsolidated and in a soupy condition over 75–80% of the cake. The dense skin which is formed accounts for the adverse behavior heretofore experienced with the highly compressible cakes; it has a high resistance and absorbs most of the pressure drop through the cake. Removal of the skin by intense mechanical mixing completely changes the behavior of the highly compressible materials in an unexpected manner and the present invention embraces this phenomenon. (Examples of highly compressible materials include flocculated suspensions of pigments, phosphate and red mud slimes, attapulgite and bentonite clays, colloidal silica, and the like.)

Prior art workers have tended to attempt to increase flow rates, and decrease the average porosity of cakes, by increasing pump pressure. Some pressure filter manufacturers have suggested using pressures as high as 10–15 atmospheres to increase rates and decrease the size and capital outlays for filters when used in purely filtering devices. Such prior art workers also seemed to believe that higher pressures would decrease liquid content of the treated materials. Although some improvement was apparently realized, increasing the pressure proved to be generally disappointing, and this is now known to be due to the effect of the resistant skin. Again, the present invention embraces the removal of the skin in combination with filtering, and such filtering as applied in this invention is generally effective at low pressures, in the order of a vacuum of approximately one atmosphere. However, with thin cakes, high pressure increases flow rate and improves clarity of the filtrate. The high pressure causes slight compaction of the thin cake, which results in small pores and better removal of migrating fine particles.

In the mixing, reacting device or machine of FIG. 4, which is generally like that shown and described in the Lodige patents earlier identified herein, a mechanically fluidized bed mix of a slurry of materials is created within the chamber. As noted, this may be achieved by a positive-action mixer. To add to this device or machine the capability of drying such bed mix by the use of a filter as taught herein has made a significant contribution to this art. This may be further illustrated and explained as follows.

Figure 11:
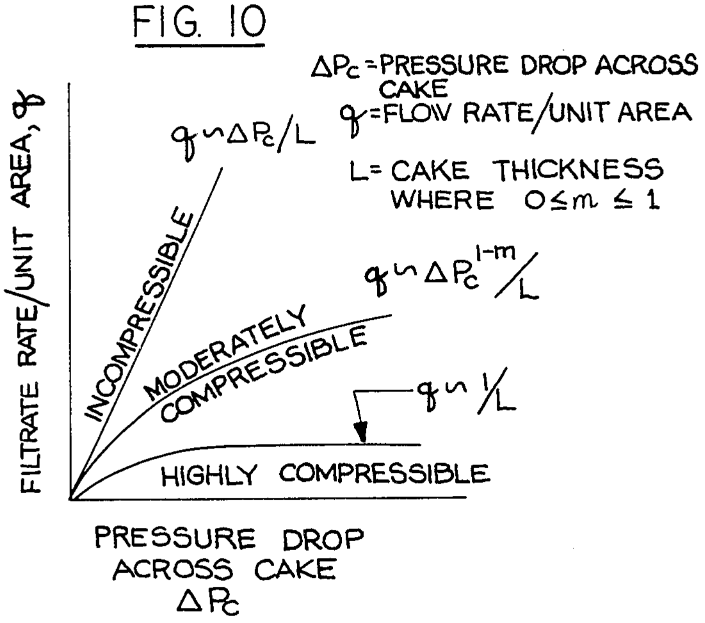

FIG. 11 depicts the effect of pressure drop across the cake vs. flow rate. For incompressible materials, the rate/unit area is directly proportional to the pressure drop and inversely proportional to the cake thickness. For moderately compressible materials, the rate increases with some power less than unit of the pressure drop. For example, if $n=0.5$, then doubling the pressure drop across the cake would increase the rate by $\sqrt{2}=1.41$, amounting to a 41% increase for a 100% increase in pressure drop. Again, the rate is inversely proportional to cake thickness.

The highly compressible material, however, behaves in a totally unexpected manner. After the rate increase at low pressure, it levels off and becomes independent of pressure drop across the cake. This behavior is believed to be the result of the skin, and it is this skin which is removed as a part of the practice of the instant invention. When the pressure drop across the cake is doubled, the skin resistance doubles, and the rate is unaffected. However, at constant pressure drop across the cake, as with the other cases, the rate is inversely proportional to the thickness. Thus, decreasing thickness is the one way the rate can be increased and it is believed that this contributes to the remarkable success achieved by the apparatus and process of the instant invention wherein most of the cake is wiped away as it is formed. Removing the skin and breaking up the unconsolidated portion of the cake permits higher rate and lower liquid content to be attained.

Figure 8:
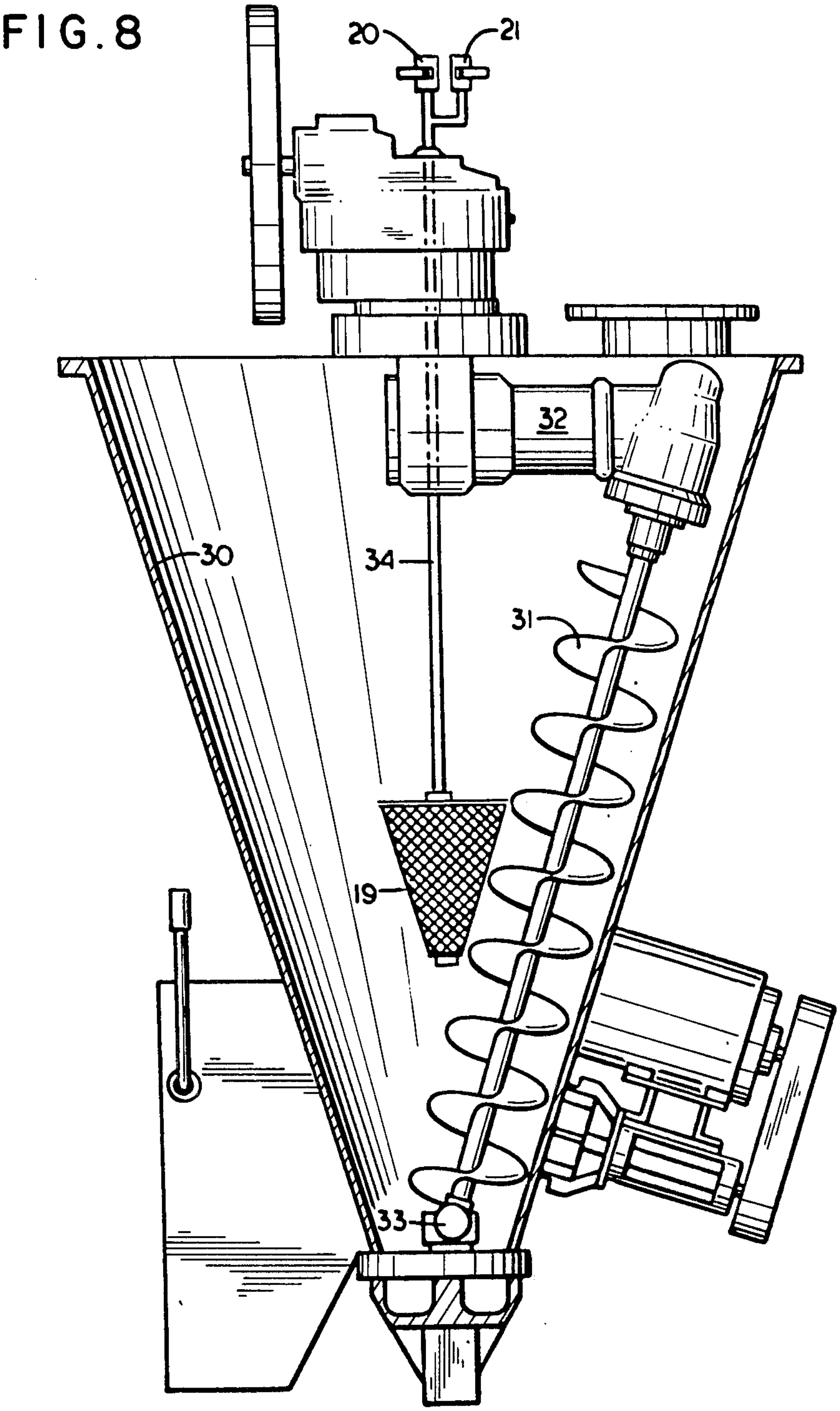
FIG. 8 is a diagrammatic view of an inverted, cone shaped nauta-type mixing, reacting device to which the present invention has been applied.

It has been indicated earlier herein that the present invention is applicable to many different types of mixers. FIG. 8 is an illustration of this. In that FIG. a nauta-type, single screw mixer is depicted. The mixer includes a truncated, inverted cone 30 comprising the mixing chamber. A mixing screw 31 is rotatable on its own axis at relatively high speeds. The screw 31 is affixed to an arm 32 which orbits the cone chamber 30 at relatively slow speeds. A suitable lower support 33 is provided so that the mixing screw 31 may rotate about the chamber 30 adjacent the wall thereof while the screw is simultaneously rotating on its own axis at relatively high speeds. There are also nauta-type mixers which employ twin screws. All of these constructions are now well known in the art. In the FIG. 8 arrangement the filter device 19 is depicted as being located centrally of the mixing chamber 30 towards the bottom thereof. The filter 19 is affixed to a tube 34 which terminates in the vacuum line 20 and purge back 21. As fluid matter accumulates within the filter device 19 it may be withdrawn by a vacuum effected through the means 20. The filter device 19 may be cleaned by back wash through the means 21.

Although not shown in detail it will be understood by those skilled in the art that the various mixing vessels 11 and 30, by way of example, may be steam jacketed in conventional manner as desired. The particular relationship between, and placement of, the mixing elements 12 and choppers 16 with respect to one another is now conventional and explained in U.S. Pat. Nos. 3,027,102 and 2,679,385 to Lodige et al. It is the proper incorporation of a filter device within such a mixer, coupled with intense mixing, which consitutes the principal part of the invention. This is true whether the mixer is of the various types mentioned above, some of which have been illustrated in some detail, or whether it is, by way of further examples, a double cone mixer, a "V" blender, or a ribbon blender, all as will be understood by those skilled in this art.

From the foregoing it will be observed that a single apparatus comprised of any one of the various mixers mentioned herein may be utilized for the mixing, reacting, washing, filtering, and vacuum or purge drying of a slurry batch of material to powdered or granular materials, for the process industry is achieved by incorporating a filter internally mounted within the mixing, reacting unit utilizing an intensive mechanically fluidized bed mix action. This filter is mounted in such a manner as to efficiently separate particles from liquid without interfering or hindering the proper mix action of the mixing, reacting unit. Thus successive processing steps of mixing, reacting, washing, filtering, and vacuum or purge drying, and processing to powdered or granular materials, may be accomplished in a single processing vessel without discharging the batch until the entire processing sequence has been completed.

Figure 12:
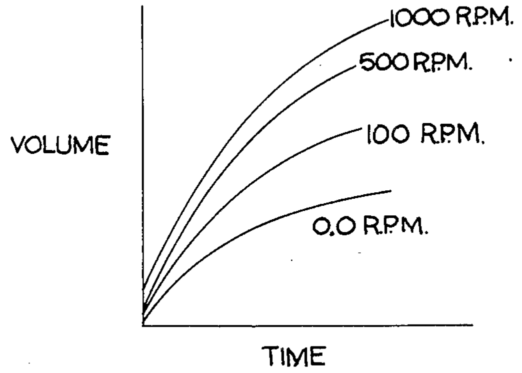

FIG. 12 illustrates the effect of mixing and filtering according to the instant invention. This FIG. represents the use of a mixer on a clay suspension, using a laboratory filter to simulate the invention. As the shear forces generated by the mixer increased, the amount of cake deposited decreased, and the volume filtered at a given time increased. The clay used to obtain the data for FIG. 12 was moderately compressible. The effect of decreasing cake thickness benefits the rate performance of incompressible, moderately compressible, and highly compressible materials.

In an experiment carried out in a positive-action mixer of the type earlier described herein, a slurry batch charge weighing 174.5 pounds (approximately 15 gallons) of salicylic acid incorporating needle-like crystals of between 20 to 40 microns (micrometers) was introduced within the drum 11. This batch was processed with four filtrations, three re-slurries with water, and a final vacuum drying to less than 0.5% moisture in a single process unit in approximately 2.5 hours. All acidity was removed. This agitation (mixing-reacting) in combination with the filtering function achieved maximum dewatering of the filter cake during the filtering and washing steps. A significant increase in the solids achieved was realized by the invention process compared to what the prior art had been able to realize in the past. And the highly acid liquid slurry was completely neutralized.

It will be understood by those skilled in the art that modifications may be made in this invention without departing from the scope and spirit thereof. As indicated, the filter may be removable from the mixer, reactor unit; it may also be retrofit to existing mixer, reactor units. The actual filter media may be changed to enable the filtering of batches of various material and particle size. Filtering may be accomplished under pressure, in some cases atmospheric (inert if desired), or by partial vacuum conditions within the mixer, reactor. The leaf type filter device 19 illustrated in FIGS. 5, 6 and 7 has been found quite efficient when used within the mixing vessels in the manner herein described. Other filter devices, such as those of the cartridge or candle type, may also be utilized.

It has earlier been indicated that a knowledge of the porosity variation is important to an understanding of, and an explanation of, why the apparatus and method of the instant invention have proved much more effective than what the prior art was able to achieve. An analysis of the average porosity of the cake will further illuminate the advantages of the invention. Thus, referring again to FIG. 10, the porosity variation in a cake for specified pressures is seen to drop across the cake. When a cake is removed from a filter by a mechanical mechanism, it is transformed into a more or less uniform wet mass having an average liquid content equal to the average of an appropriate relationship of the types shown in FIG. 10. The average porosity of a highly compressible cake is greatly affected by the large fraction of the cake which is unconsolidated. The moderately compressible material has an average porosity which is not far from the arithmetic average of the porosities at the cake surface and in the layer adjacent to the supporting medium.

Figure 13:
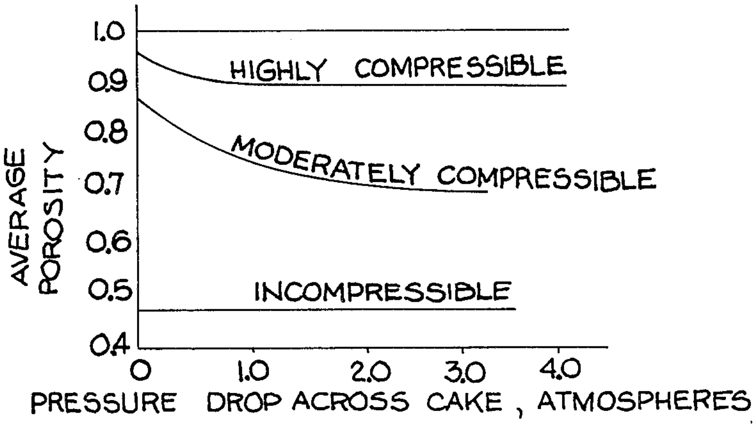

Referring now to FIG. 13, the effect of pressure drop across the cake on the average porosity is illustrated. It is clear that increasing pressure, alone, has a disappointing effect on the average liquid content of the highly compressible materials after a relatively low pressure is exceeded. When the cake is mixed and treated according to the present invention, however, the resistant skin is broken up, and the unconsolidated portions of the cake are transported to the medium thereby permitting more liquid to be removed. Thus, the mixing process of the present invention has proved extraordinarily successful even with highly compressible cakes, and it provides a significant improvement with the moderately compressible cakes.

At first blush, it might appear that the apparatus and process of the instant invention would improve the rate of filtration, but not the average liquid content of the incompressible material. This, however, is not true; this is because of another phenomenon relating to large particles, defined as having characteristic lengths of more than approximately 20 microns, and this phenomenon is also incorporated in the invention. For such large particulate materials, the capillary pressure of water in the pores is generally less than one atmosphere. As the particle size increases, the capillary pressure decreases. Application of vacuum to the filter elements when used with large particles (as just defined) is believed to result in sucking water out of the pores, permitting entrance of air on the opposite side of the cake. For fine particles, a characteristic length being of approximately 5.0 microns, the capillary pressure is higher than atmospheric, and air cannot enter the pores. This problem is compounded when it is considered that the present invention preferably operates at about one atmosphere. The invention takes this into account. Thus, with the larger particles, liquid is sucked out; gas enters the opposite side; and the liquid content is reduced. However, if the cake is thick, the rate of liquid removal may be low. Further, the gas may break through the larger pores first and then bypass the smaller pores. Mixing, reacting and filtering, along with periodic backwash, minimizes the break-through of gas problem, permits a build up of skin which is then periodically popped off, and leads to an unusually effective operation resulting in a crumbly mass of material.

Figure 14:
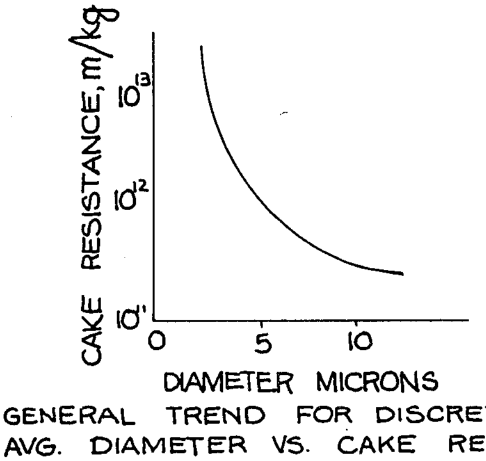

It has been earlier mentioned herein that slurries including very fine particles (approximately 5 microns or thereabouts) have heretofore been very difficult, if not impossible, to treat, and certainly not in a continuous operation within a single vessel. The instant apparatus and process, however, may be utilized to treat such difficult slurries by first subjecting them to a mixing-reacting step wherein the fine particles are aggregated so as to in effect convert the slurry to one made up of larger particles. Thus, even though the resistance of cakes begins to rise rapidly when the average equivalent diameter drops below 5 microns, see FIG. 14, the instant invention takes this into account by first aggregating them into larger groups.

In another experiment carried out in the positive-action mixer earlier described, some difficulty was encountered in handling a pigment slurry containing particles in the range of one to five microns. Although the instant invention realized a significant improvement over what the prior art could accomplish, even greater improvement was achieved when an aggregating agent was added to the slurry. This agent, coupled with rapid mixing, resulted in the aggregating agent being uniformly distributed. A period of reduced or mild mixing followed in which the aggregates or flocs were formed. The reduced plow speed preserved the aggregates while still effectively servicing the filter device. Heat was also applied via a steam jacket.

A specific flow or filtration resistance of $10^{12}$ m/kg corresponds to a difficult to filter material, and a value of $10^{13}$ m/kg is close to the maximum which can be tolerated by normal processing. Thus, in the practice of the instant invention, it has been found that this problem can be solved by aggregating the small particles into large flocs or clusters, and this will facilitate eventual separation and filtration. (In some applications prior art workers have attempted a similar conversion but have found the aggregates formed through aggregation to be highly compressible and difficult to handle with traditional separation equipment.) As described throughout this description of the invention at hand, the apparatus and process utilized as taught herein have made it possible to handle these highly compressible and difficult materials in an expeditious manner.

Having thus described the invention, what is claimed as new and what is desired to be protected by Letters Patent is set forth in the claims which follow.

What is claimed is:

1. In a mixing, reacting process including the steps of creating a liquid-solids slurry batch of material in a mixing, reacting chamber and subjecting said slurry batch to a positive mix action in said chamber by means of a positive-action mixing element, the improvement which includes the steps of: continuously presenting said liquid-solids slurry batch to a filter device located in said chamber as the viscosity of said slurry batch increases due to increasing particle or solids concentration, the filter device being proximally located with respect to the positive-action mixing element; continuously filtering liquid from said liquid-solids slurry batch and accumulating such liquid in said chamber device while said slurry batch is subjected to said positive mix action in said chamber; periodically removing solids which accumulate on said filter device while said solids remain in said chamber; removing any skin which forms on said solids by the mechanical mixing action of the slurry on the filter device while said solids remain in said chamber; withdrawing liquid accumulating in said filter device; and ensuring that the successive processing steps of mixing, reacting, filtering and drying said liquid-solids slurry batch are completed in said chamber without discharging said slurry batch from said chamber; whereby said liquid-solids slurry batch is reduced to a friable particulate condition while still in said chamber.

2. The process of claim 1 in which said mix action is of the mechanically fluidized bed mix type.

3. The process of claim 1 as applied to organic chemical systhesis.

4. The process of claim 1 including the step of inhibiting the build up of said slurry batch on said filter device by locating said mixing element in close proximity to said filter device and causing relative movement between said mixing element and said filter device.

5. In a mixing, reacting unit comprised of a mixing, reacting chamber and a positive-action mixing element located within said chamber, said positive-action mixing element being movable along a predetermined path for mixing a liquid-solids slurry formed by liquid and solid materials placed in the chamber, the improvement comprising:

- a filter device disposed within the chamber in close proximity to the positive-action mixing element so as to filter a continous flow of liquid-solids slurry presented by the positive-action mixing element;
- means for removing any cake buildup of aggregated slurry particles which form on the filter device, said removing means being operative to remove cake buildup while the slurry and the filter remain in the chamber, said filter device being positioned so that mechanical mixing action of the positive-action mixing element removes skin from any cake buildup of aggregated particles forming on the filter device; and
- means for withdrawing liquid accumulating in the filter device while the filter is in the chamber to reduce the slurry to a batch of dry particulate while still in the chamber.

6. The mixing, reacting unit of claim 5 wherein said liquid withdrawing means includes means to apply a vacuum to said filter device in order to aid in the withdrawal of fluid matter from said slurry.

7. The mixing, reacting unit of claims 5 or 6 wherein said cake buildup removing means includes backwash means connected to said filter device for aiding in the removal of any layer of solids which may have formed on said filter device.

8. The mixing, reacting unit of claim 5 in which said filter device is a leaf-type including a frame for a cage comprised of filter media supported by said frame so as to form an opening into which filtered liquid may pass.

9. The mixing, reacting unit of claim 8 in which said means to withdraw liquid accumulating in said filter device from said slurry comprises conduit means extending from said opening and through said chamber.

10. The mixing, reacting unit of claim 9 including means to impose a vacuum on said conduit means in order to aid in the withdrawal of liquid from said slurry.

11. The mixing, reacting unit of claims 9 or 10 including back wash means connected to said conduit means for aiding in the removal of any layer of solids which may have formed on said filter device.

12. The mixing, reacting unit of claim 5 in which said positive-action mixing element is such as to subject said liquid-solids slurry to a mechanically fluidized bed mix action.

13. The mixing, reacting unit of claim 12 in which said mixing and reacting chamber comprises a horizontal drum, said filter device being located on an interior wall of said drum and means to rotate said positive-action mixing element adjacent said interior wall past said filter device.

14. The mixing, reacting unit of claim 13 in which said means to rotate said positive-acting mixing device comprises a driven, rotatable shaft disposed axially of said drum, and an arm connecting said mixing element to said shaft.

15. The mixing, reacting unit of claim 14 including a plurality of said arms, each said arm having a said mixing element thereon, said filter device being so located on said interior wall that a said mixing element passes on either side of said filter device.

16. The mixing, reacting unit of claim 14 including a high speed chopper located within said drum, said filter device and said chopper being disposed within said drum so as also to be disposed with the mechanically fluidized bed mix of liquid-solids slurry set up when said mixing, reacting unit is actuated.

17. The mixing, reacting unit of claim 16 wherein said positive-action mixing element is of the ploughshare type.

18. The mixing, reacting unit of claim 16 wherein said positive-action mixing element is of the paddle type.

19. The mixing, reacting unit of claim 5 in which said positive-action mixing element comprises a mixing screw rotatable on its own axis at relatively high speeds; said mixing, reacting chamber comprising a truncated, inverted cone in which said screw is disposed; and means to rotate said screw on its own axis while moving it about said cone.

* * * * *